Feb. 27, 1940.                P. KOSTER                    2,191,617
                           GRINDING MACHINE
                         Filed May 11, 1938            2 Sheets-Sheet 1

INVENTOR.
Paul Koster.

BY  *Maxwell E. Sparrow*
              ATTORNEY.

Feb. 27, 1940.   P. KOSTER   2,191,617
GRINDING MACHINE
Filed May 11, 1938   2 Sheets-Sheet 2

INVENTOR.
Paul Koster.
BY
ATTORNEY.

Patented Feb. 27, 1940

2,191,617

UNITED STATES PATENT OFFICE 2,191,617

GRINDING MACHINE

Paul Koster, Paris, France

Application May 11, 1938, Serial No. 207,207
In France May 14, 1937

6 Claims. (Cl. 51—241)

Rectifying machines with planetary movement are already known which are used particularly as rectifiers for valve seats, but these machines have the inconvenience of being heavy since they enclose the motor actuating or driving the grinder, and also the inconvenience none the less important of being given a rotary vibratory movement in the hands of the operator. Such movement can therefore occasion defects in the rectification or trueing up and is very tiring for the operator.

The present invention has for object to overcome these objections by providing a trueing up machine with planetary movement one of the characteristic features of which resides in that the trueing up system with planetary movement is movable in a casing comprising handles for manipulating and guiding the machine and which, during the operation of the latter, remains immovable and insensible to the reactions of the planetary movement thus causing no shock to the hands of the operator.

The machine is further characterised in that its movement can be communicated to it by a transmission such as a flexible shaft or by a transmission with cardan shaft or even directly by an electric motor or by any other mechanical, electrical, pneumatic or hydraulic means of suitable kind.

Figure 1:
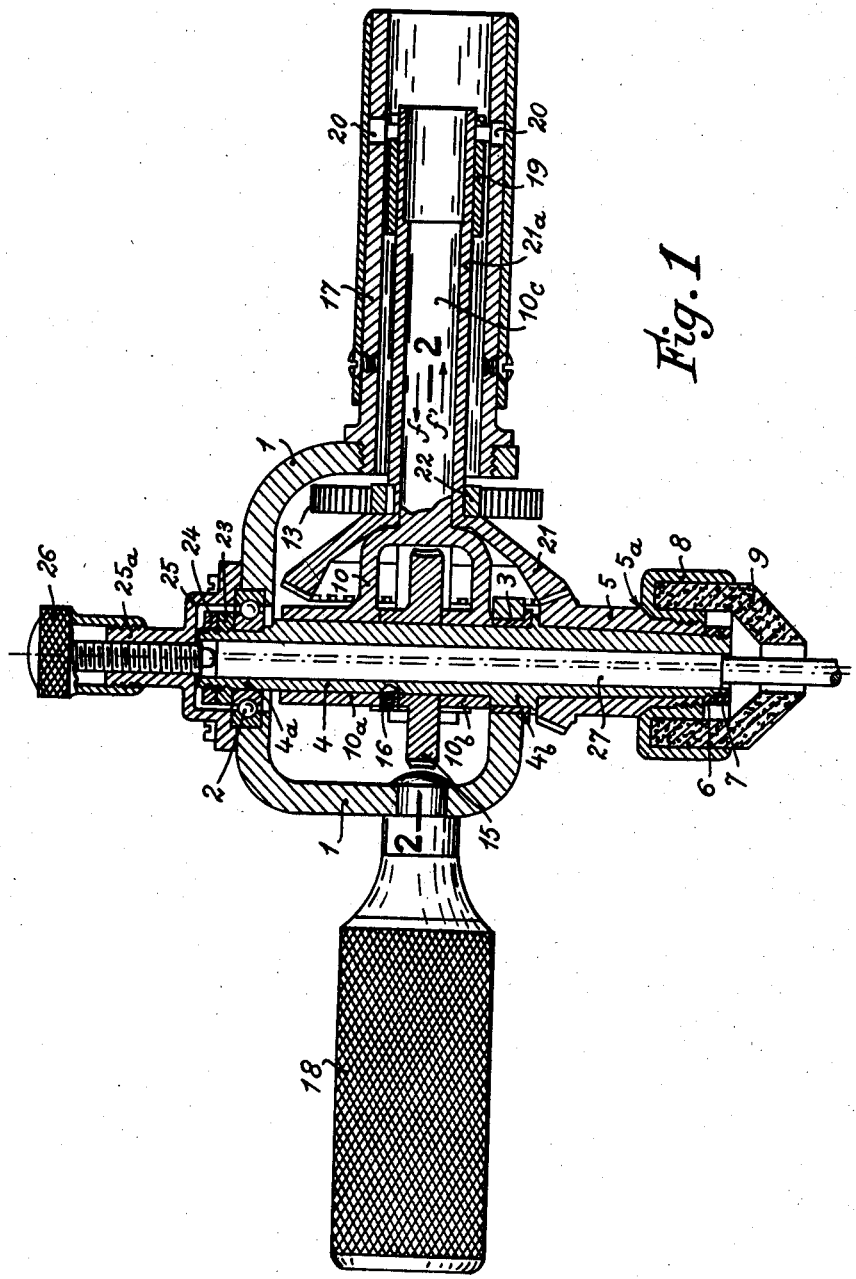
Figure 2:
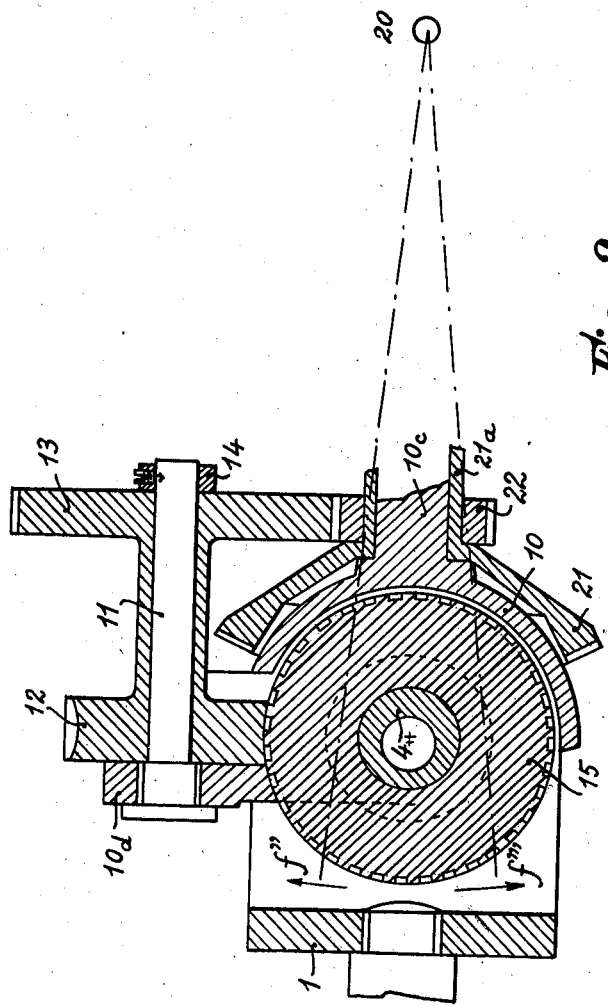

Various other features will become evident from the following description with reference to the accompanying drawings which show:

Fig. 1 an elevation of a rectifying machine constructed according to the invention shown in partial section;

Fig. 2 the same machine in plan view with part section, the mechanism being sectioned along the line 2—2 of Figure 1.

In a constructional form of the subject of the invention, given by way a simple example in no way limiting, the machine consists as follows:

In a casing 1 are provided two bearings 2 and 3 aligned one upon the other and formed, the first one by a ball bearing and the second one either by a ball bearing or by a ring of bronze or any other material.

In these bearings can rotate a hollow main shaft 4 preferably hollow and having journals $4_a$ and $4_b$ corresponding to the bearings. These journals $4_a$, $4_b$ are concentric to the axis of the central bore of the shaft, and placed on the same line, they turn round in the casing 1. All the other external parts of the shaft are concentric in relation to a second axis and are, in consequence, eccentric in relation to the first axis.

The lower part of the shaft 4 is conical and receives a pinion wheel 5 provided with a spindle maintained on the shaft by two stop rings 6 and 7. This arrangement allows for taking up the play between the shaft and the pinion wheel 5 which must nevertheless rotate freely on the latter.

On the hollow shaft of the pinion wheel 5 is screwed a cup 8 bearing on a conical bearing surface provided at $5_a$ on the said shaft. In the bowl or cup 8 is secured the grinder 9.

On the part of the shaft 4 situated between the two bearing surfaces or journals $4_a$ and $4_b$ is provided a frame 10 having a shaft comprising on the one hand two sleeves $10_a$ and $10_b$ surrounding the shaft 4 and a shaft $10_c$ perpendicular to the axis of the sleeves. The frame comprises in addition an arm $10_d$ (Fig. 2) carrying a small stationary shaft 11 on which can rotate an endless screw 12 integral with a pinion wheel 13. This screw and this pinion wheel can, for example, be formed in a single piece. They turn loose on the stationary shaft 11 and are held thereon by a stop ring 14.

The endless screw 12 meshes with a wheel 15 with endless screw fast on the main shaft 4 by means of a grub or like screw 16.

On the casing 1 are screwed two hollow handles 17 and 18.

In the handle 17 is fitted a socket 19 pivoting on two axes 20 parallel to the axis of the bore of the shaft 4. In this socket 19 can freely slide the shaft $21_a$ of a large shafted pinion wheel 21 meshing with the grinder carrying pinion wheel 5.

The shaft $21_a$ is hollow and receives internally, on the one hand, the shaft $10_c$ of the frame 10 and, on the other hand, the extremity of a flexible driving cable connected to an electric motor.

On the shaft $21_a$ is fast a small pinion wheel 22 meshing with the pinion wheel 13 of the endless screw 12.

The shafted frame 10, the main shaft 4 and the wheel with the endless screw form a mounted assembly.

The ball bearing 2 is secured on the main shaft 4 by two screw threaded rings 23, 24 and on the casing by a small bridge 25 secured to the latter by means of several screws.

This bridge 25 is surmounted with a socket $25_a$ in which can move a micrometer screw 25 the extremity of which is, in case of emergency, intended to bear on the upper face of a centering and guiding rod 27 introduced into the guide of the valve to be trued.

Owing to the immobility of its frame it is possible to support the machine, contrarily to the hitherto existing machines of the same kind, by a fixed support provided with means for axial sliding movement and arranged in a suitable position for insuring the right position of the grinder with regard to the valve to be rectified.

In case of no use being made of such a support, it will be sufficient, for placing the machine appropriately, to use the centering rod 27 situated in the way above stated.

The working of the machine is then as follows:

After suitably disposing the machine, it is possible, either by means of an axial shifting of its support, or by the micrometric screw 26, to move nearer or further apart the grinder 9 to or from the seat of the valve to be trued up accordingly as one turns the screw in one or other direction. This adjustment being completed, the large shafted toothed or pinion wheel 21 is set going by means of the flexible drive.

From this moment, two different movements which are combined together, take place:

1. The very rapid rotation movement of the grinder through the intermediary of the grinder holder 5 and the hollow shafted pinion wheel 21.

2. The slow translatory movement of the complete mounted assembly consisting of the frame 10, shaft 4 and the wheel of the endless screw 6, which movement is communicated to the said wheel by the endless screw 12 which itself receives its rotary movement from the pinion wheels 13 and 22 and the hollow shaft 21a of the pinion wheel 21.

The grinder, through the intermediary of the small shafted pinion wheel 5, the large pinion wheel 21 and the flexible drive therefore rotates about the main shaft 4 which shaft is itself driven but preferably in the reverse direction of rotation, by the mounted assembly above mentioned.

In this way there is obtained the planetary movement but during which it will be observed that the shafted frame 10 receives two different movements:

1. An alternate longitudinal movement in the direction of the arrows f and f' of Fig. 1 by sliding in the pivotal socket 19;

2. An alternate angular movement in the direction of the arrows f'' and f''' of Fig. 2 by pivoting on the axes 20.

The grinder 9 then receives an eccentric movement around the guiding rod 27 without the operator feeling the slightest displacement in holding the machine by its handles.

It is obvious that the modifications of shape and detail can be embodied in the machine hereinabove described without thereby exceeding the spirit of the invention, said machine being applicable to other purposes than the trueing up of valves.

What I claim is:

1. In a machine for rectifying motor valve seats, comprising a grinder performing a rapid rotary movement and besides a slow movement eccentric with regard to the valve seat axis, a casing provided with handles, bearings in said casing, a main shaft journalled in said bearings, means to drive said main shaft with slow rotary movement concentric with said bearings, two eccentric portions on said main shaft, a grinder support mounted on one of said eccentric portions, means to drive said grinder support with a rapid rotary movement, a part to carry the means driving said shaft and said grinder support, said part being mounted on the second eccentric portion of said shaft, to permit of driving both said means as well as the grinder with a movement eccentric with regard to the axis of rotation of the said shaft so as to ensure immobility of the casing of the machine during rectification and to permit of mounting said casing on a fixed support.

2. In a machine for rectifying motor valve seats, comprising a grinder performing a rapid rotary movement and also a slow movement eccentric with regard to the axis of the valve seat, a casing, bearings in said casing, a main shaft journalled in said bearings, means to drive said shaft with a slow rotary movement eccentric with said bearings, two eccentric portions on said shaft, a grinder support mounted on one of said eccentric portions, means to drive said grinder support with a rapid rotary movement, a part to carry the means driving the said shaft and the said grinder, mounted on the second of said eccentric portions, said part comprising a frame provided with two sleeves traversed by the said second portion of the shaft, a cylindrical shaft on said frame to guide a hollow driving shaft, to permit of a movement of said frame, eccentrically with regard to the axis of rotation of said main shaft.

3. In a machine for rectifying motor valve seats, comprising a grinder performing a rapid rotary movement and also a slow movement eccentric with regard to the axis of the valve seat, a casing, bearings integral with the casing, a main shaft journalled in said bearings, means to drive said shaft with a slow rotary movement concentric with said bearings, two eccentric portions on said shaft, a grinder support mounted on one of said eccentric portions, means for driving said grinder support with a rapid rotary movement, a part carrying the means driving the said shaft and the grinder and mounted on the second eccentric shaft portion, the said part comprising a frame provided with two sleeves traversed by the second portion of the said shaft, a cylindrical shaft on said frame to guide a hollow driving shaft, to ensure an eccentric movement of said part with regard to the axis of rotation of said main shaft, the driving means of said main shaft consisting of a worm wheel keyed to the said second eccentric portion of the said shaft, a worm driven by a pinion, and another pinion meshing with it and keyed to the hollow driving shaft.

4. In a machine for rectifying motor valve seats, comprising a grinder performing a rapid rotary movement and also a slow movement eccentric with regard to the axis of the valve seat, a casing, bearings in this casing, a main shaft journalled in said bearings, means to drive this shaft with a rotary movement slow and concentric with said bearings, two eccentric portions on said shaft, a grinder support mounted on one of said eccentric portions, means to drive said grinder support with a rapid rotary movement, a part to carry the means driving said shaft and said grinder and mounted on the said second eccentric portion, the said part comprising a frame provided with two sleeves traversed by the said second shaft portion, a cylindrical shaft on said frame to guide a hollow driving shaft, to permit of an eccentric movement of said part with regard to the axis of rotation of said main shaft, the means driving said grinder support, consisting of a pinion provided on the grinder support and meshing with a toothed crown provided on the hollow driving shaft.

5. In a machine for rectifying motor valve seats, comprising a grinder performing a rapid rotary movement and a slow movement eccentric with regard to the axis of the valve seat, a casing, bearings in this casing, a main shaft journalled in said bearings, means to drive this shaft with a slow rotary movement concentric with said bearings, two eccentric portions on said shaft, a grinder support mounted to one of said eccentric portions, means to drive said grinder support with a rapid rotary movement, a part to carry the means driving the shaft and the grinder and mounted on the said second eccentric portion, said part comprising a frame provided with two sleeves traversed by the said second shaft portion, a cylindrical shaft on said part to guide a hollow driving shaft so as to ensure an eccentric movement of the said part with regard to the rotation axis of the said main shaft, the hollow shaft effecting with said part a to and fro movement transverse with regard to the main shaft and an alternating angular movement, a bush provided with two pivots being fixed in one of the handles, for receiving the said hollow shaft pivoting with it and sliding therein.

6. In a machine for rectifying motor valve seats, comprising a grinder performing a rapid rotary movement and a slow movement eccentric with regard to the axis of the valve seat, a casing, bearings in this casing, a main shaft journalled in said bearings, means to drive said shaft with a rotary movement concentric with said bearing, two eccentric portions on said shaft, a grinder support mounted on one of said eccentric portions, means to drive said grinder support with a rapid rotary movement, a part to carry the means driving the shaft and the grinder and mounted on the said second eccentric portion of the shaft, the said part comprising a frame provided with two sleeves traversed by the said second eccentric portion of the shaft, a cylindrical shaft on said part to serve as a guide for a hollow driving shaft, to ensure an eccentric movement of said part with regard to the axis of rotation of the said main shaft, this main shaft being hollow for receiving a centering rod fixed in the guide of the valve to be trued.

PAUL KOSTER.